(12) United States Patent
Whitlaw et al.

(10) Patent No.: US 10,501,208 B2
(45) Date of Patent: Dec. 10, 2019

(54) GANTRY SYSTEM AND METHOD FOR PROCESSING AN AIRCRAFT

(71) Applicant: THE BOEING COMPANY, Chicago, IL (US)

(72) Inventors: James Grady Whitlaw, Ladson, SC (US); John Eric Miller, Ladson, SC (US); Jairo A. Diaz, Ladson, SC (US); Matthew H. Mellin, Ladson, SC (US)

(73) Assignee: THE BOEING COMPANY, Chicago, IL (US)

( * ) Notice: Subject to any disclaimer, the term of this patent is extended or adjusted under 35 U.S.C. 154(b) by 217 days.

(21) Appl. No.: 15/639,470

(22) Filed: Jun. 30, 2017

(65) Prior Publication Data

US 2019/0002130 A1    Jan. 3, 2019

(51) Int. Cl.
  *B64F 5/30*  (2017.01)
  *B64F 5/10*  (2017.01)
(52) U.S. Cl.
  CPC . *B64F 5/10* (2017.01); *B64F 5/30* (2017.01)
(58) Field of Classification Search
  CPC .................................... B64F 5/10; B64F 5/30
  See application file for complete search history.

(56) References Cited

U.S. PATENT DOCUMENTS

| 6,557,235 | B1 * | 5/2003 | Katz | B23Q 1/012 |
| | | | | 29/563 |
| 9,452,616 | B1 | 9/2016 | Mathis et al. | |
| 9,579,679 | B2 | 2/2017 | Mathis | |
| 2015/0343473 | A1 | 12/2015 | Mathis | |

* cited by examiner

*Primary Examiner* — Jason L Vaughan
*Assistant Examiner* — Amanda Kreiling
(74) *Attorney, Agent, or Firm* — Jay J. Hoetter; The Small Patent Law Group LLC (57) ABSTRACT

A gantry system for processing an aircraft includes a gantry receiving a fuselage of the aircraft having a gantry frame with an arched member. The gantry system includes first and second locating arms extending between inner and outer ends movably coupled to the gantry frame. The gantry system includes a bracket assembly having a first locating arm bracket pivotably coupled to the first locating arm, a second locating arm bracket pivotably coupled to the second locating arm, and a head assembly bracket with a head assembly coupled thereto having an end effector for processing the fuselage. The head assembly is variably positionable by the first and second locating arms moving along the gantry frame for positioning the end effector relative to the fuselage.

20 Claims, 9 Drawing Sheets

GANTRY SYSTEM AND METHOD FOR PROCESSING AN AIRCRAFT

BACKGROUND

The subject matter herein relates generally to a gantry system and method for processing an aircraft.

During manufacture of aircraft, processing the exterior surfaces of the aircraft, such as cleaning, preparing, painting, coating, inspecting, and the like, is relatively challenging and time-consuming due to the large area, the wide range of dimensions and unique geometry associated with the aircraft. The shapes of the tail and the nose present problems with processing the exterior surface of the aircraft. Other structures, such as the wings and the vertical tail, present challenges in accessing the exterior surfaces of the aircraft. Additionally, positioning of the end effector for processing the aircraft needs to be maintained with high accuracy during the process.

Some known systems for processing the exterior surfaces of the aircraft include providing a manufacturing facility for processing the aircraft having many individual robots, such as cartesian coordinate robots, six-axis robots, selective-compliance-articulated robot arms (SCARAs), and the like, stationed around the floor space configured to reach the entire aircraft for processing. Such robots have many axes of motion and require many coordinated movements along the multiple axes of motion during processing. Such robots are large and expensive and occupy a large amount of floor space when permanently positioned in the manufacturing facility.

A need remains for a gantry system and method for processing an aircraft in a cost effective and reliable manner.

BRIEF DESCRIPTION

In one example, a gantry system for processing an aircraft is provided including a gantry having an interior space configured to receive a fuselage of the aircraft. The gantry has a gantry frame having an arched member configured to pass from a first side of the interior space to a second side of the interior space along an arcuate path. The gantry system includes a first locating arm extending between an inner end and an outer end movably coupled to the gantry frame and a second locating arm extending between an inner end and an outer end movably coupled to the gantry frame. The gantry system includes a bracket assembly having a first locating arm bracket pivotably coupled to the inner end of the first locating arm, a second locating arm bracket pivotably coupled to the inner end of the second locating arm, and a head assembly bracket. A head assembly is coupled to the head assembly bracket having an end effector for processing the fuselage. The head assembly is variably positionable in the interior space by the first and second locating arms moving along the gantry frame for positioning the end effector relative to the fuselage.

In another example, a gantry system for processing an aircraft is provided including a gantry having an interior space configured to receive a fuselage of the aircraft. The gantry has a forward gantry frame having a forward arched member configured to pass from a first side of the interior space to a second side of the interior space along an arcuate path and an aft gantry frame having an aft arched member configured to pass from a first side of the interior space to a second side of the interior space along an arcuate path. The gantry system includes a forward carrier assembly coupled to the forward gantry frame and an aft carrier assembly coupled to the aft gantry frame. The forward carrier assembly includes a first locating arm extending between an inner end and an outer end being movably coupled to the forward gantry frame and a second locating arm extending between an inner end and an outer end being movably coupled to the forward gantry frame. The forward carrier assembly includes a forward bracket assembly pivotably coupled to the inner ends of the first and second locating arms having a forward head assembly bracket. The aft carrier assembly includes a first locating arm extending between an inner end and an outer end being movably coupled to the aft gantry frame and a second locating arm extending between an inner end and an outer end being movably coupled to the aft gantry frame. The aft carrier assembly includes an aft bracket assembly pivotably coupled to the inner ends of the first and second locating arms having an aft head assembly bracket. A head assembly coupled to the forward head assembly bracket and the aft head assembly bracket. The head assembly has a rail including a track and an end effector movable along the track between the forward and aft head assembly brackets for processing the fuselage. The head assembly is variably positionable in the interior space by the forward carrier assembly and the aft carrier assembly for positioning the end effector relative to the fuselage.

In another example, a method is provided for processing a fuselage of an aircraft using a gantry system having a gantry including gantry frames having arched members configured to pass from a first side to a second side of an interior space along arcuate paths, locating arms movably coupled to the gantry frames, bracket assemblies pivotably coupled to corresponding locating arms, and a head assembly coupled to the bracket assemblies. The method includes axially positioning the gantry relative to the fuselage at a first axial position. The method includes moving the locating arms along the arched members to locate the head assembly at a first angular location relative to the fuselage while the gantry is at the first axial position and actuating the head assembly to move an end effector of the head assembly along the fuselage to process the aircraft while the gantry is at the first axial position and while the head assembly is at the first angular location. The method includes moving the locating arms along the arched members to locate the head assembly at a second angular location relative to the fuselage while the gantry is at the first axial position and actuating the head assembly to move the end effector of the head assembly along the fuselage to process the aircraft while the gantry is at the first axial position and while the head assembly is at the second angular location.

DETAILED DESCRIPTION

Figure 1:
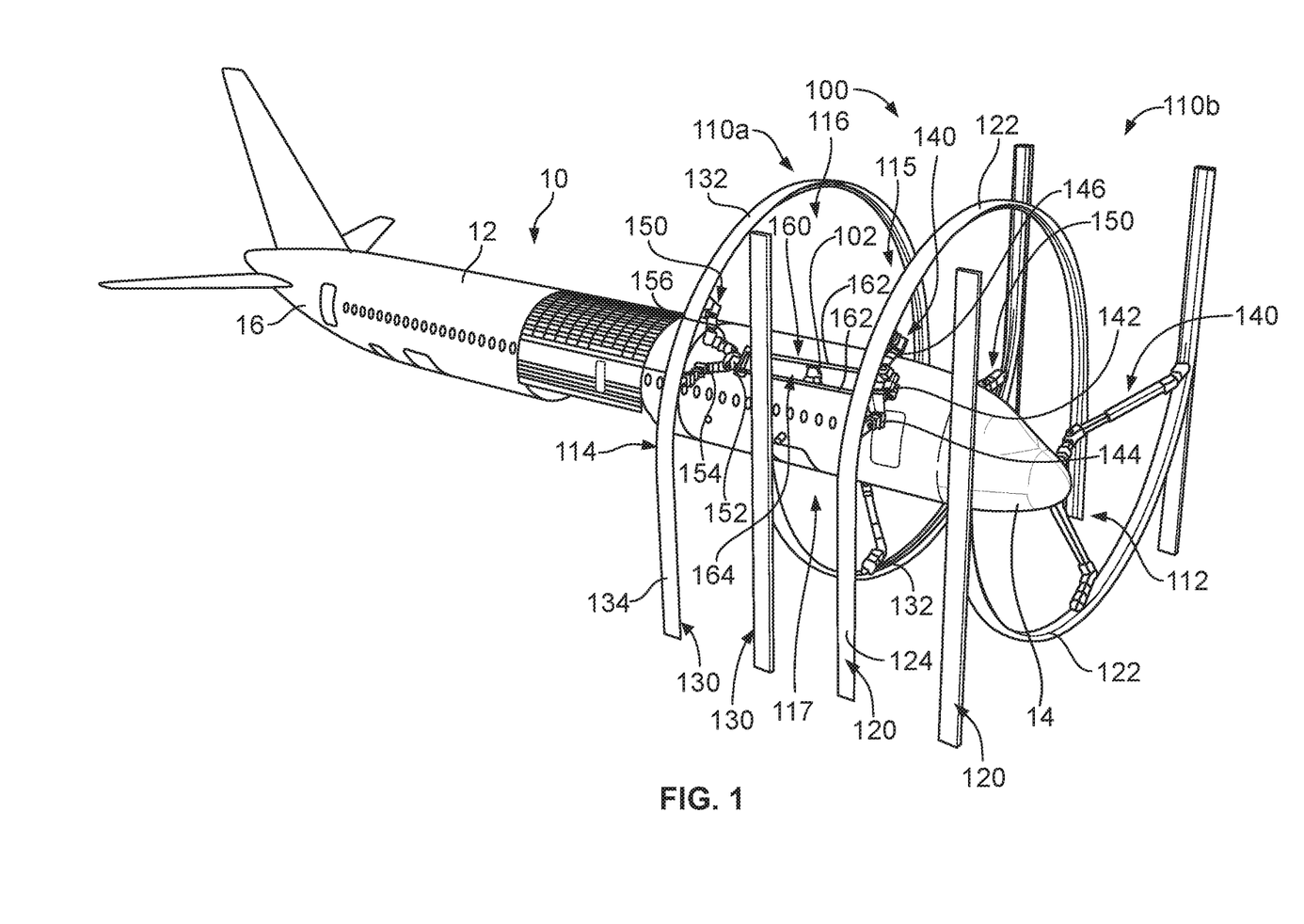
FIG. 1 illustrates a gantry system in accordance with an exemplary embodiment for processing an aircraft.

FIG. 1 illustrates a gantry system 100 in accordance with an exemplary embodiment for processing an aircraft 10. For example, the gantry system 100 may be used for one or more processes for the aircraft 10, such as a coating process, an abrasion process, and inspection process, a cleaning process, a painting process, or other processes required along and or around the aircraft 10. The gantry system 100 includes one or more end effectors 102 for processing the aircraft 10. Various types of end effectors 102 may be utilized depending on the particular process for the aircraft 10. For example, the end effector 102 may include one or more nozzles for coating, painting, or washing the aircraft 10. In other various embodiments, the end effector 102 may include abrasive elements for abrasion processing the aircraft 10. In other various embodiments, the end effector 102 may include a camera or sensor for inspecting the aircraft 10. Different types of end effectors 102 may be simultaneously supported by the gantry system 100. In other various embodiments, the end effectors 102 may be removable and replaceable for different types of processing.

The gantry system 100 may be used during manufacture and/or repair of the aircraft 10. The gantry system 100 may be movable relative to the aircraft 10 and/or the aircraft 10 may be movable relative to the gantry system 100 for processing different areas of the aircraft 10. In an exemplary embodiment, the gantry system 100 is used for processing a fuselage 12 of the aircraft 10 and/or a nose 14 of the aircraft 10 and/or a tail 16 of the aircraft 10. In other various embodiments, the gantry system 100 may be used to process other parts of the aircraft 10, such as the wings (not shown). The fuselage 12 has a generally constant cylindrical shape while the nose 14 and the tail 16 may be irregular or cone-shaped. The gantry system 100 may be manipulated to process the various portions of the aircraft 10. In an exemplary embodiment, during processing, the gantry system 100 is moved along the aircraft 10, such as from the nose 14 to the tail 16 and processes different areas of the aircraft 10 as the gantry system 100 is moved along the aircraft 10. In various embodiments, the gantry system 100 is moved in stages along the aircraft 10, with each stage being at a different axial position along the aircraft 10. In other various embodiments, the gantry system 100 may be fixed in place and the aircraft 10 may move relative to the gantry system 100 in stages, with each stage providing a different axial portion of the aircraft 10 to the gantry system 100. The gantry system 100 moves the end effector 102 around the aircraft 10 at each of the stages. For example, the end effector 102 is moved at least partially circumferentially around the aircraft 10 at each stage for processing the aircraft 10.

The gantry system 100 includes one or more gantries 110 each defining an interior space 112 configured to receive the aircraft 10, such as the nose 14, the fuselage 12 and/or the tail 16 of the aircraft 10. The interior space 112 has a first side 114 receiving a first side of the aircraft 10, a second side 115 receiving a second side of the aircraft 10, a top 116 receiving a top side of the aircraft 10 and a bottom 117 receiving a bottom side of the aircraft 10. The end effector 102 may be movable to the first side 114 and/or the second side 115 and/or the top 116 and/or the bottom 117 for processing the corresponding portions of the aircraft 10. In the illustrated embodiment, the gantry system 100 includes an upper gantry 110a closed at the top and a lower gantry 110b closed at the bottom and open at the top. The upper and lower gantries 110 may be similar and include similar components and reference numerals with corresponding "a" and "b" identifiers. In an exemplary embodiment, the gantry 110 includes a forward gantry frame 120 and an aft gantry frame 130. The gantry 110 may include any number of gantry frames, including a single gantry frame.

The forward gantry frame 120 includes a forward arched member 122 configured to pass from the first side 114 of the interior space 112 to the second side 115 of the interior space 112 along an arcuate path configured to generally follow a shape of the fuselage 12 of the aircraft 10 in a spaced apart relationship. Optionally, the forward gantry frame 120 includes forward vertical members 124 below the forward arched member 122. The forward vertical members 124 lift the forward arched member 122 to a predetermined height, which may correspond to the height of the aircraft 10. The height may be variable by adjusting the forward vertical members 124 and/or replacing the forward vertical members 124 with vertical members of different heights. The forward gantry frame 120 may include support members (not shown) for supporting the forward arched member 122 and/or the forward vertical members 124 from within the interior space 112 and/or from an exterior space exterior of the gantry 110.

The aft gantry frame 130 includes an aft arched member 132 configured to pass from the first side 114 of the interior space 112 to the second side 115 of the interior space 112 along an arcuate path configured to generally follow a shape of the fuselage 12 of the aircraft 10 in a spaced apart relationship. Optionally, the aft gantry frame 130 includes aft vertical members 134 below the aft arched member 132. Optionally, the aft gantry frame 130 may be similar to or identical to the forward gantry frame 120. In various embodiments, the aft gantry frame 130 is independently movable relative to the forward gantry frame 120 in one or more directions, such as longitudinally, laterally, transversely, pivotably, and the like. In other embodiments, the aft gantry frame 130 may be fixed relative to the forward gantry frame 120 such that the forward and aft gantry frames 120, 130 maintain a fixed positional relationship relative to each other. For example, tie bars or other frame support members may be coupled between the forward and aft gantry frames 120, 130.

The gantry system 100 includes a carrier assembly associated with each gantry frame for carrying and positioning the end effector 102. In the illustrated embodiment, the gantry system 100 includes a forward carrier assembly 140 coupled to the forward gantry frame 120 and an aft carrier assembly 150 coupled to the aft gantry frame 130. A head assembly 160 is coupled between the forward carrier assembly 140 and the aft carrier assembly 150. The head assembly 160 supports the end effector 102. Movement of the forward carrier assembly 140 on the forward gantry frame 120 causes corresponding movement of the head assembly 160 relative to the forward gantry frame 120. Movement of the aft carrier assembly 150 on the aft gantry frame 130 causes corresponding movement of the head assembly 160 relative to the aft gantry frame 130. Such movement positions the end effector 102 relative to the aircraft 10. In an exemplary embodiment, the end effector 102 is movable on the head assembly 160, such as between the forward carrier assembly 140 and the aft carrier assembly 150 for processing the aircraft 10.

The forward carrier assembly 140 includes a forward bracket assembly 142 coupled to and supporting the head assembly 160. The forward carrier assembly 140 includes a first locating arm 144 extending between the forward bracket assembly 142 and the forward gantry frame 120 and a second locating arm 146 extending between the forward bracket assembly 142 and the forward gantry frame 120. The first and second locating arms 144, 146 support the forward bracket assembly 142. For example, the locating arms 144, 146 may hang from the forward gantry frame 120 and meet at the forward bracket assembly 142. The locating arms 144, 146 are movable along the forward gantry frame 120 for locating the forward bracket assembly 142, and thus the head assembly 160, in the interior space 112. For example, the locating arms 144, 146 may slide or roll along the forward gantry frame 120 to change an angular position of the head assembly 160 in the interior space 112. In an exemplary embodiment, the locating arms 144, 146 are telescoping to change lengths of the locating arms 144, 146 to change a radial position of the head assembly 160 in the interior space 112.

The aft carrier assembly 150 includes an aft bracket assembly 152 coupled to and supporting the head assembly 160. The aft carrier assembly 150 includes a first locating arm 154 extending between the aft bracket assembly 152 and the aft gantry frame 130 and a second locating arm 156 extending between the aft bracket assembly 152 and the aft gantry frame 130. The first and second locating arms 154, 156 support the aft bracket assembly 152. For example, the locating arms 154, 156 may hang from the aft gantry frame 130 and meet at the aft bracket assembly 152. The locating arms 154, 156 are movable along the aft gantry frame 130 for locating the aft bracket assembly 152, and thus the head assembly 160, in the interior space 112. For example, the locating arms 154, 156 may slide or roll along the aft gantry frame 130 to change an angular position of the head assembly 160 in the interior space 112. In an exemplary embodiment, the locating arms 154, 156 are telescoping to change lengths of the locating arms 154, 156 to change a radial position of the head assembly 160 in the interior space 112.

In an exemplary embodiment, the head assembly 160 extends between the forward bracket assembly 142 and the aft bracket assembly 152. The head assembly 160 includes one or more rails 162 defining a track 164 to control movement of the end effector 102. The end effector 102 is movable along the track 164, such as between the forward bracket assembly 142 and the aft bracket assembly 152. In the illustrated embodiment, the track 164 is linear, confining the end effector 102 to linear movement during processing. For example, once the forward and aft gantry frames 120, 130 are located relative to the aircraft 10, the end effector 102 may process the aircraft 10 by a raster processing movement around the aircraft 10 where the end effector 102 moves linearly along the aircraft 10 along a processing path after which the forward and aft carrier assemblies 140, 150 are moved to change the angular position of the head assembly 160 where the end effector 102 is again moved linearly along the aircraft 10 along a different processing path. Once the end effector 102 has been rastered around the desired portion(s) of the aircraft 10 at the first stage (for example, at the first axial position), the forward and aft gantry frames 120, 130 may be moved relative to the aircraft 10 to a different, second stage for processing different portions of the aircraft 10.

Figure 2:
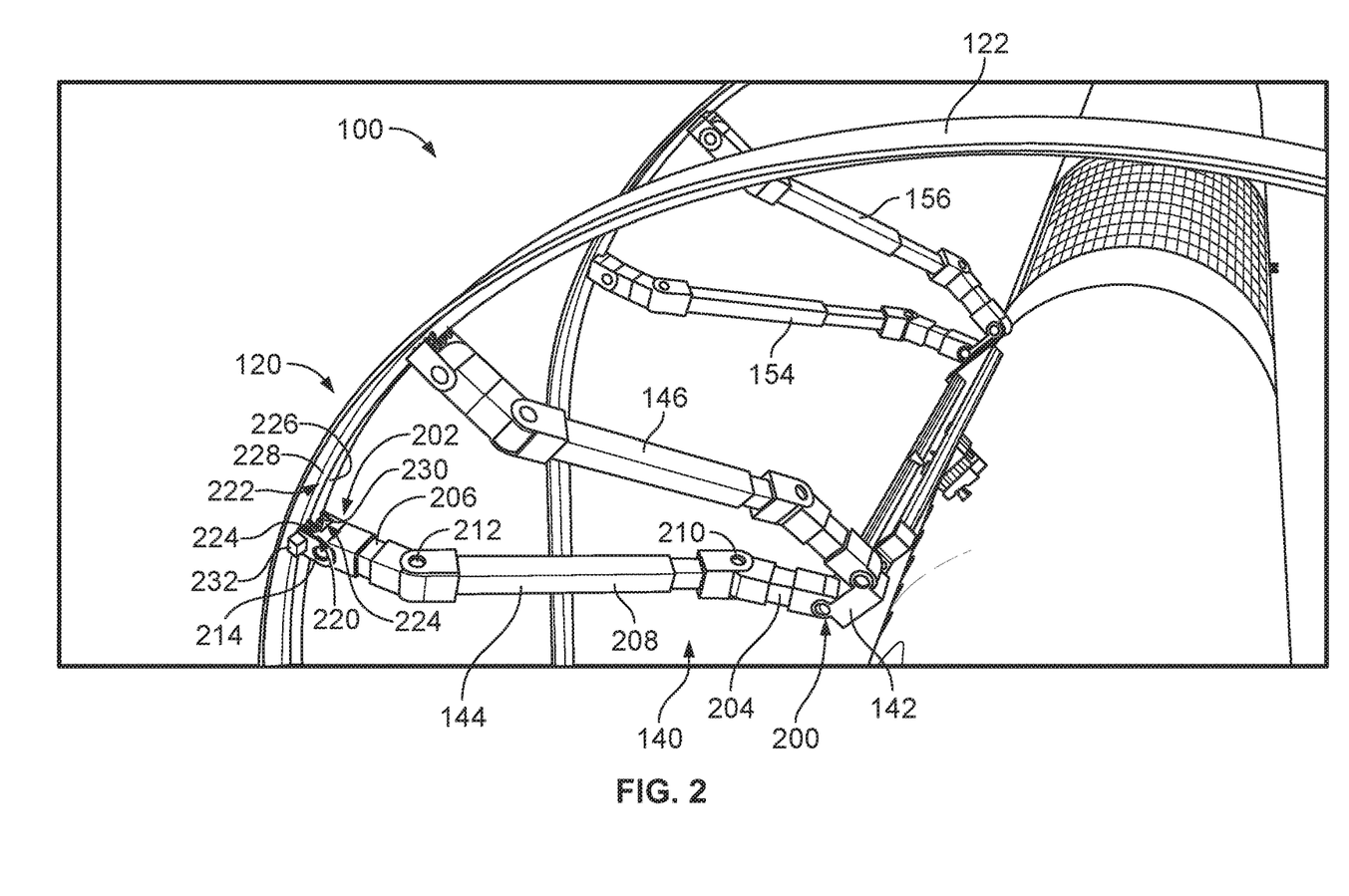
FIG. 2 illustrates a portion of the gantry system in accordance with an exemplary embodiment showing a locating arm coupled to a gantry frame.

FIG. 2 illustrates a portion of the gantry system 100 in accordance with an exemplary embodiment showing the first and second locating arms 144, 146 of the forward carrier assembly 140 coupled to the forward gantry frame 120. The following description is in reference to the first locating arm 144, which may be representative of the other locating arms 146, 154, 156 (shown in FIG. 1) and like features may be identified with like reference numerals on the other locating arms 146, 154, 156 later in the detailed description.

The first locating arm 144 extends between an inner end 200 and an outer end 202. The inner end 200 is configured to be coupled to the forward bracket assembly 142. The outer end 202 is configured to be coupled to the forward gantry frame 120. In an exemplary embodiment, the first locating arm 144 includes an inner mount 204 at the inner end 200 and an outer mount 206 at the outer end 202. A telescoping member 208 is provided between the inner mount 204 and the outer mount 206. The telescoping member 208 is extendable and retractable to change a length of the first locating arm 144 (for example, the first locating arm 144 is shown partially retracted and shorter compared to the locating arm 154, which is shown partially extended). In various embodiments, the telescoping member 208 may include differently sized square metal tubes or cylindrical metal tubes that are coaxially aligned with the smaller tube movably received within the larger tube. Optionally, the telescoping member 208 may be mechanically controlled to change the relative positions of the elements to change the length of the telescoping member 208. For example, the telescoping member 208 may be mechanically lengthened or shortened by an electric motor, a pneumatic cylinder, a hydraulic cylinder, or another device to control the length of the telescoping member 208.

In an exemplary embodiment, the telescoping member 208 is pivotably coupled to the inner mount 204 at a first joint 210. The relative positions of the telescoping member 208 and the inner mount 204 may be changed by pivoting the telescoping member 208 at the first joint 210. Optionally, the first joint 210 may be mechanically controlled to change the relative positions of the telescoping member 208 and the inner mount 204. For example, the telescoping member 208 may be pivoted by an electric motor, a pneumatic cylinder, a hydraulic cylinder, or another device to control the position of the telescoping member 208 relative to the inner mount 204.

In an exemplary embodiment, the telescoping member 208 is pivotably coupled to the outer mount 206 at a second joint 212. The relative positions of the telescoping member 208 and the outer mount 206 may be changed by pivoting the telescoping member 208 at the second joint 212. Optionally, the second joint 212 may be mechanically controlled to change the relative positions of the telescoping member 208 and the outer mount 206. For example, the telescoping member 208 may be pivoted by an electric motor, a pneumatic cylinder, a hydraulic cylinder, or another device to control the position of the telescoping member 208 relative to the outer mount 206.

In an exemplary embodiment, the outer mount 206 includes a slide 220 coupled to the forward gantry frame 120. Optionally, the slide 220 may be pivotably coupled to the outer mount 206, such as at a third joint 214. The slide 220 is received in a track 222 along the forward gantry frame 120. The track 222 may extend along the forward arched member 122 and/or the forward vertical member 124. The slide 220 is movable along the forward gantry frame 120 to change the position of the first locating arm 144 relative to the forward gantry frame 120. In an exemplary embodiment, the slide 220 includes rollers 224 engaging the track 222 to control moving of the slide 220 along the forward gantry frame 120. Optionally, the rollers 224 may engage an interior surface 226 of the track 222 and/or an exterior surface 228 of the track 222. The slide 220 may include other types of elements to allow and control movement of the slide 220 along the forward gantry frame 120, such as a rack and pinion arrangement, gears, belts, chains and the like.

In an exemplary embodiment, the slide 220 includes a locking element 230, such as a clamp or brake, configured to engage the track 222 and/or the rollers 224 to lock a position of the slide 220 along the forward gantry frame 120. The locking element 230 may be unlocked to again allow movement.

In an exemplary embodiment, the slide 220 includes a driver 232 for driving the rollers 224 to move the slide 220 along the forward gantry frame 120. Optionally, the driver 232 may be an electric motor configured to rotate the rollers 224. Other types of drivers 232 may be utilized in alternative embodiments.

Figure 3:
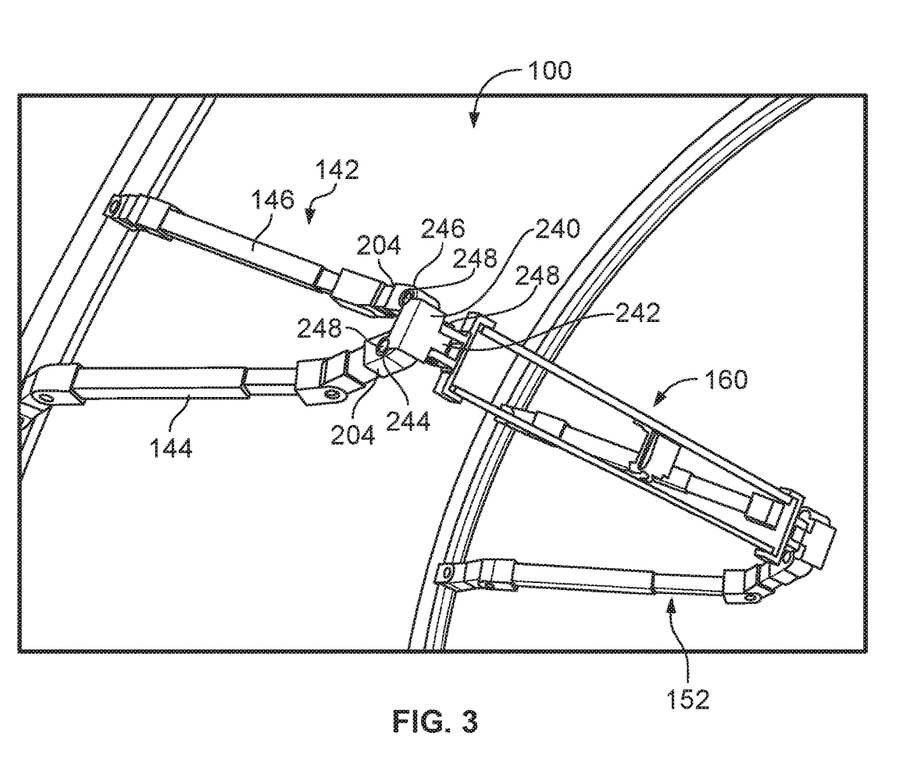
FIG. 3 illustrates a portion of the gantry system in accordance with an exemplary embodiment showing a bracket assembly coupled to locating arms and a head assembly.

FIG. 3 illustrates a portion of the gantry system 100 in accordance with an exemplary embodiment showing the forward bracket assembly 142 coupled to the locating arms 144, 146 and the head assembly 160. The forward bracket assembly 142 may be representative of the other bracket assemblies, such as the aft bracket assembly 152, and like features may be identified with like reference numerals in the detailed description.

The forward bracket assembly 142 includes a hub 240 having a head assembly bracket 242, a first locating arm bracket 244 and a second locating arm bracket 246. The head assembly 160 is coupled to the head assembly bracket 242, such as pivotably coupled thereto. The first locating arm 144 is coupled to the first locating arm bracket 244, such as pivotably coupled thereto. The second locating arm 146 is coupled to the second locating arm bracket 246, such as pivotably coupled thereto. In the illustrated embodiment, the brackets 242, 244, 246 are clevis mounts using pins 248 to couple the corresponding structures thereto. For example, the head assembly 160 is pivotably coupled to the head assembly bracket 242 at a joint using the corresponding pin 248, the inner mount 204 of the first locating arm 144 is pivotably coupled to the first locating arm bracket 244 at a joint by the corresponding pin 248, and the inner mount 204 of the second locating arm 146 is pivotably coupled to the second locating arm bracket 246 at a joint by the corresponding pin 248.

Optionally, the connections to the forward bracket assembly 142 may be mechanically controlled to change the relative positions of the hub 240 relative to the head assembly 160 and/or the first locating arm 144 and/or the second locating arm 146. For example, the head assembly 160, first locating arm 144 and/or second locating arm 146 may be pivoted, such as at the corresponding pin 248, by an electric motor, a pneumatic cylinder, a hydraulic cylinder, or another device to control the angular position relative to the hub 240. The forward bracket assembly 142 may include a pivot driver (not shown) within the hub 240 operably coupled to the first locating arm 144 and/or the first locating arm bracket 244 to change a pivot angle between the forward bracket assembly 142 and the first locating arm 144 to orient the head assembly 160.

Figure 4:
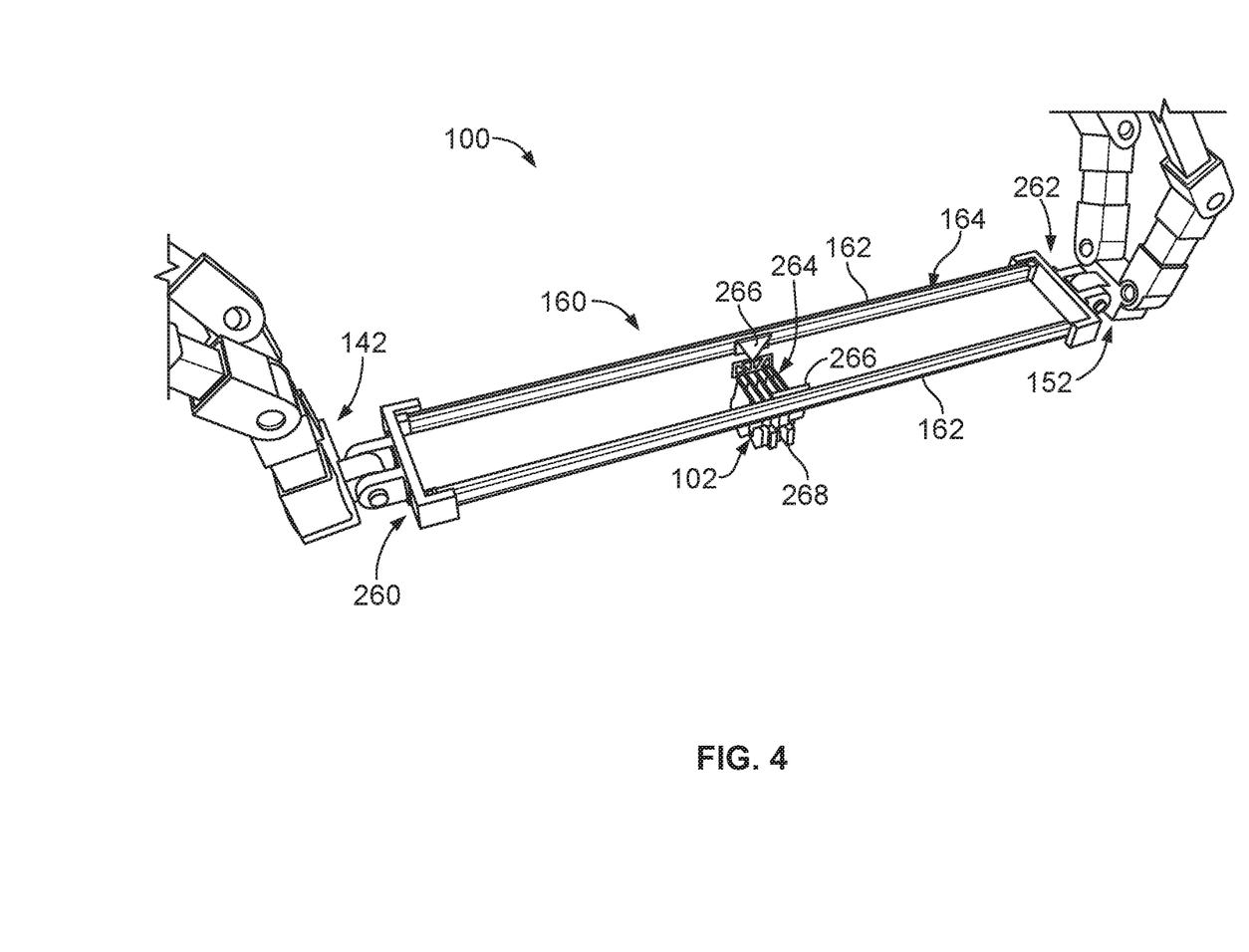
FIG. 4 illustrates a portion of the gantry system in accordance with an exemplary embodiment showing the head assembly coupled between the bracket assemblies.

FIG. 4 illustrates a portion of the gantry system 100 in accordance with an exemplary embodiment showing the head assembly 160 coupled between the forward bracket assembly 142 and the aft bracket assembly 152. The head assembly 160 includes a forward mount 260 coupled to the forward bracket assembly 142 and an aft mount 262 coupled to the aft bracket assembly 152. In various embodiments, the forward mount 260 is pivotably coupled to the forward bracket assembly 142 and the aft mount 262 is pivotably coupled to the aft bracket assembly 152.

The rails 162 extend between the forward mount 260 and the aft mount 262. In the illustrated embodiment, the head assembly 160 includes a pair of rails 162; however, the head assembly 160 may include any number of rails 162 including a single rail. In the illustrated embodiment, the rails 162 are parallel to each other and define a linear track 164 for the end effector 102.

In an exemplary embodiment, the head assembly 160 includes a head unit 264 and the end effector 102. The head unit 264 includes slides 266 engaging the rails 162 for moving along the track 164. In an exemplary embodiment, the slides 266 include rollers engaging the track 164 to control moving of the slides 266 along the rails 162. Optionally, the rollers may engage one or more surfaces of the rails 162 defining the track 164. The slides 266 may include other types of elements to allow and control movement of the slides 266 along the rails 162, such as a rack and pinion arrangement, gears, belts, chains and the like.

The end effector 102 is provided at an interior end 268 of the head unit 264 and is movable with the head unit 264 along the rails 162. The end effector 102 is configured to face the aircraft 10 for processing the aircraft 10. The head unit 264 moves back and forth along the rails 162 between the forward bracket assembly 142 and the aft bracket assembly 152 during processing of the aircraft 10. Various types of end effectors 102 may be utilized depending on the particular process for the aircraft 10. For example, the end effector 102 may include one or more nozzles for coating, painting, or washing the aircraft 10. In other various embodiments, the end effector 102 may include abrasive elements for abrasion processing the aircraft 10. In other various embodiments, the end effector 102 may include a camera or sensor for inspecting the aircraft 10. The end effector 102 may be removable from the head unit 264 for changing the type of processing performed by the head assembly 160.

Figure 5:
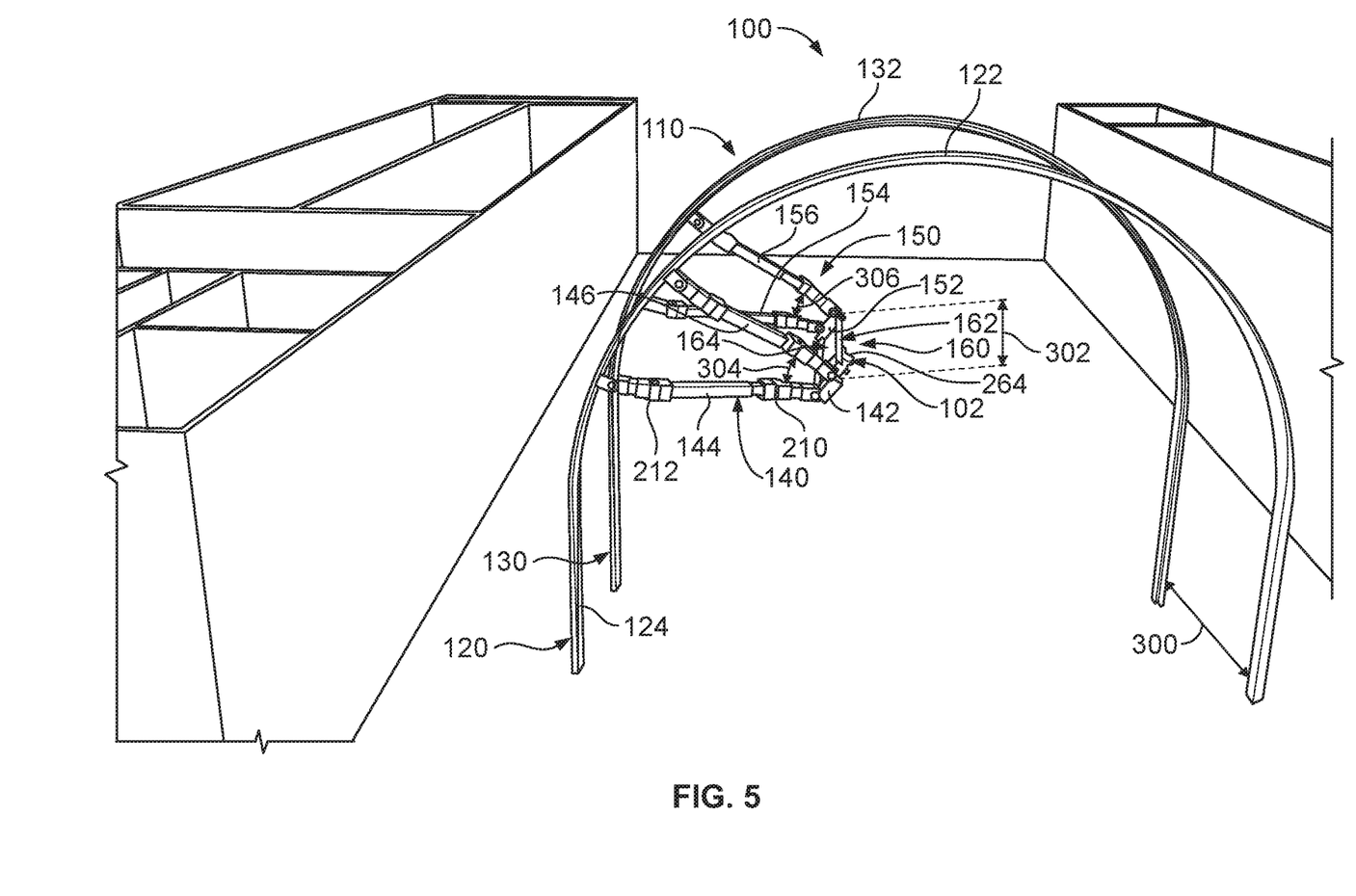
FIG. 5 illustrates the gantry system in accordance with an exemplary embodiment.

FIG. 5 illustrates the gantry system 100 in accordance with an exemplary embodiment. FIG. 5 shows the head assembly 160 positioned in the interior space 112 by the forward and aft carrier assemblies 140, 150. The head assembly 160 is variably positionable in the interior space 112 by adjusting the forward gantry frame 120 and/or the aft gantry frame 130; by adjusting the connection points of the first and second locating arms 144, 146 of the forward carrier assembly 140 relative to the forward gantry frame 120 and/or by adjusting the connection points of the first and second locating arms 154, 156 of the aft carrier assembly 150 relative to the aft gantry frame 130; by adjusting the lengths of the first and second locating arms 144, 146 and/or by adjusting the length of the first and second locating arms 154, 156; by adjusting the angles of the first and second joints 210, 212 of the locating arms 144, 146, 154, 156; by adjusting a pivot angle of the head assembly 160 at the forward bracket assembly 142 and/or the aft bracket assembly 152; and/or by adjusting a position of the head unit 264 along the rails 162.

During processing, the forward and aft gantry frames 120, 130 are axially positioned along the aircraft 10. The forward and aft gantry frames 120, 130 are configured to be fixed at an axial position or stage relative to the aircraft 10 and held in such position while the forward and aft carrier assemblies 140, 150 are manipulated for positioning the head assembly 160 during processing. Optionally, the forward and aft carrier assemblies 140, 150 are held in such position while the head unit 264 is manipulated and moved during processing. For example, the forward and aft carrier assemblies 140, 150 are configured to be successively manipulated between different angular positions at least partially circumferentially around the aircraft 10 (for example, below the aircraft 10, at a first side of the aircraft 10, above the aircraft 10, at a second side of the aircraft 10, and the like) such as in a sweeping arcuate path around the aircraft 10. The head assembly 160 is configured to be manipulated by moving back and forth between the forward carrier assembly 140 and the aft carrier assembly 150 for processing a strip or section of the aircraft 10 at a time.

In an exemplary embodiment, during setup, once the forward and aft gantry frames 120, 130 are axially positioned along the aircraft 10, such as at a first axial position, the forward and aft carrier assemblies 140, 150 may be positioned along the forward and aft gantry frames 120, 130. For example, the locating arms 144, 146 of the forward carrier assembly 140 may be moved to predetermined angular locations along the forward gantry frame 120 and the locating arms 154, 156 of the aft carrier assembly 150 may be moved to predetermined angular locations along the aft gantry frame 130. The locating arms 144, 146 of the forward carrier assembly 140 may be telescoped to a predetermined length and the locating arms 154, 156 of the aft carrier assembly 150 may be telescoped to a predetermined length. During setup, the head assembly 160 may be pivoted to a predetermined pivot angle, such as a pivot angle that faces the end effector 102 toward the aircraft 10. Once positioned, the locating arms 144, 146, 154, 156 may be locked in place at the selected angular locations relative to the forward and aft gantry frames 120, 130 and/or the head assembly 160 may be locked in place at the selected pivot angle relative to the carrier assemblies 140, 150.

In an exemplary embodiment, once the head assembly 160 is located relative to the aircraft 10 at the area of the aircraft 10 to be processed, the head assembly 160 may be actuated to move the end effector 102 along the aircraft 10 to process the aircraft 10 while the gantry 110 is at the first axial position and while the head assembly 160 is at the first angular location. In various embodiments, the end effector 102 is configured to move in a linear path along the track 164 to process the fuselage 12 while the forward and aft carrier assemblies 140, 150 remain fixed. In an exemplary embodiment, the head unit 264 moves linearly along the track 164 defined by the rails 162 between the forward carrier assembly 140 and the aft carrier assembly 150. With each pass, the end effector 102 thus processes a linear strip of area along the aircraft 10.

In an exemplary embodiment, once one linear strip is processed, the forward and aft carrier assemblies 140, 150 may be moved relative to the forward and aft gantry frames 120, 130 to process a different strip or area of the aircraft 10. For example, the carrier assemblies 140, 150 may be moved to process an adjacent area of the aircraft 10. The locating arms 144, 146, 154, 156 are moved along the forward and aft gantry frames 120, 130, such as along the forward and aft arched members 122, 132, to locate the head assembly 160 at a second angular location relative to the aircraft 10. In an exemplary embodiment, the gantry 110 remains at the first axial position while the carrier assemblies 140, 150 are moved to successive angular locations. The process is repeated around the aircraft 10 with the carrier assemblies 140, 150 moving to successive angular locations and with the head unit 264 being linearly actuated along the aircraft 10 to process linear strips along the aircraft 10.

In an exemplary embodiment, once the processing at the first axial position is completed, the gantry 110 may be moved to a second axial position, such as adjacent the first axial position along the aircraft 10. For example, the forward and aft gantry frames 120, 130 are moved relative to the aircraft 10 to the second axial position where the aircraft 10 may be circumferentially processed in a similar manner as the processing at the first axial position.

In the illustrated embodiment shown in FIG. 5, the forward and aft gantry frames 120, 130 have a nominal first spacing 300 corresponding to a length 302 of the head assembly 160. For example, the first spacing 300 may be approximately equal to the length 302. The forward and aft carrier assemblies 140, 150 are provided at corresponding angular locations to locate the head assembly 160 at an upper left quadrant relative to the aircraft 10 (viewed from the front of the aircraft). In the illustrated embodiment, the first and second locating arms 144, 146 have an acute arm angle 304 therebetween and the first and second locating arms 154, 156 have an acute arm angle 306, which, in the illustrated embodiment, is approximately equal to the arm angle 304. The locating arms 144, 146, 154, 156 may have other arm angles 304, 306 in alternative embodiments, such as right arm angles or obtuse arm angles. In the illustrated embodiment, the forward locating arms 144, 146 are bent out of plane with the forward gantry frame 120, such as rearward of the forward gantry frame 120 and the aft locating arms 154, 156 are bent out of plane with the aft gantry frame 130, such as rearward of the aft gantry frame 130.

Figure 6:
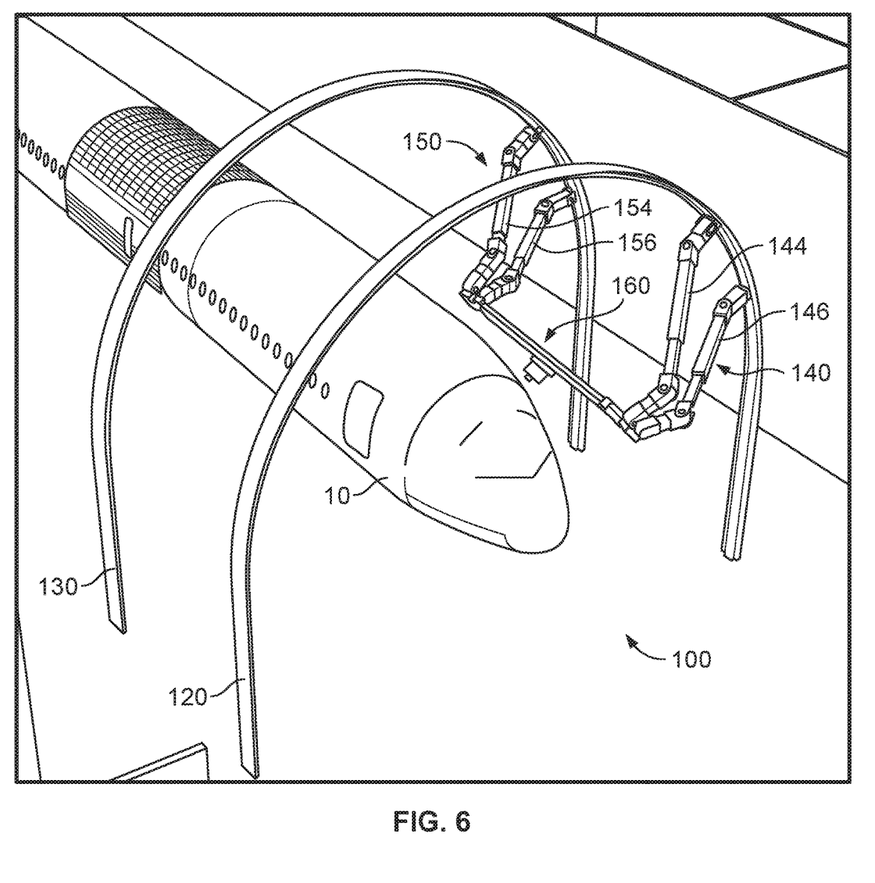
FIG. 6 illustrates the gantry system in accordance with an exemplary embodiment.

FIG. 6 illustrates the gantry system 100 in accordance with an exemplary embodiment. FIG. 6 shows the forward and aft gantry frames 120, 130 still in the first axial position shown in FIG. 5; however, FIG. 6 shows the forward and aft carrier assemblies 140, 150 provided at a different angular location to locate the head assembly 160 at an upper right quadrant relative to the aircraft 10 (viewed from the front of the aircraft). The locating arms 144, 146, 154, 156 are shown in different telescoped positions relative to the positions shown in FIG. 5. The locating arms 144, 146, 154, 156 are shifted forward of the corresponding forward and aft gantry frames 120, 130 in the illustrated embodiment.

Figure 7:
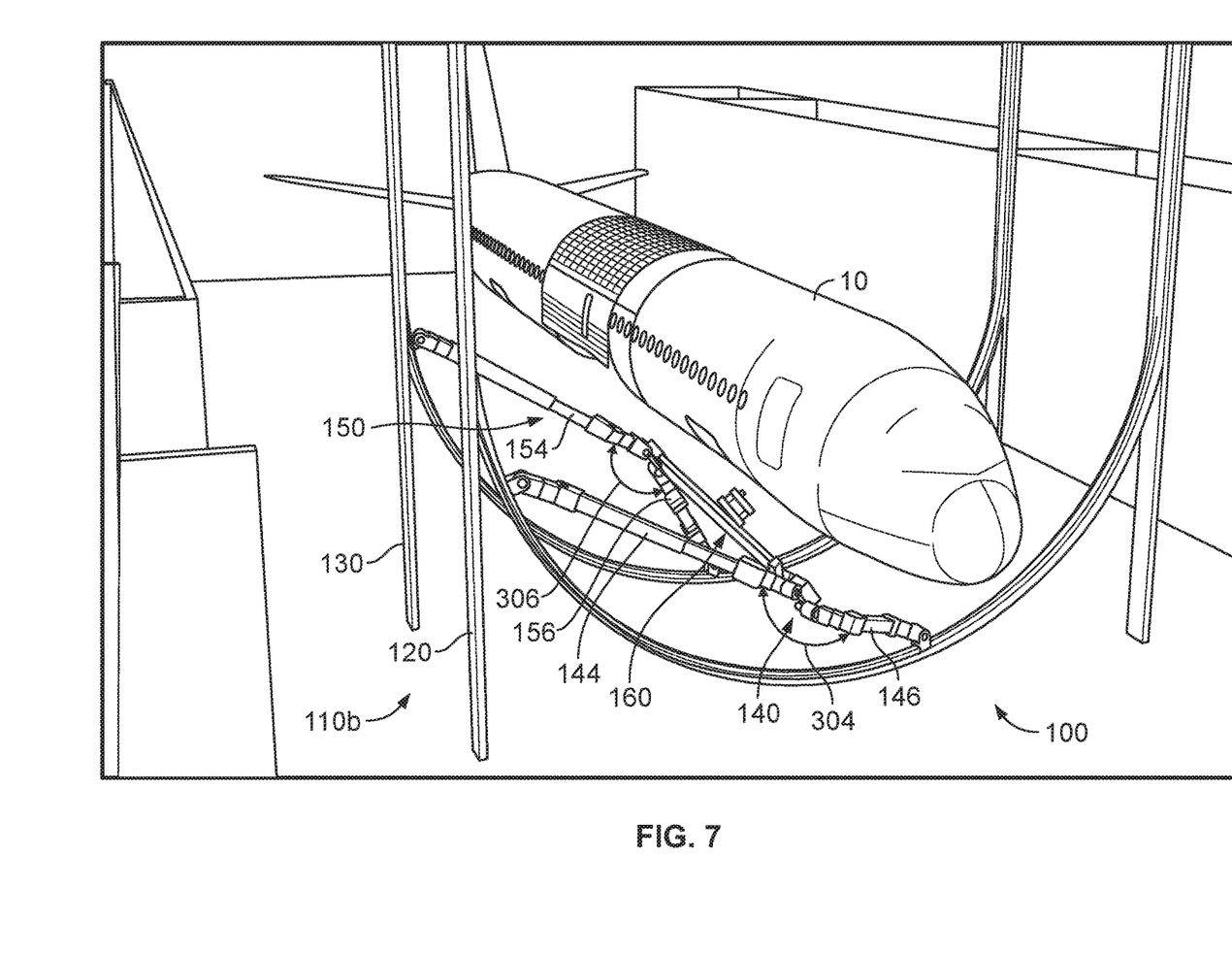
FIG. 7 illustrates the gantry system in accordance with an exemplary embodiment.

FIG. 7 illustrates the gantry system 100 in accordance with an exemplary embodiment. FIG. 7 shows the lower gantry 110b showing the forward and aft gantry frames 120, 130 and the forward and aft carrier assemblies 140, 150 provided at an angular position to locate the head assembly 160 at a lower left quadrant relative to the aircraft 10 for processing a lower portion of the aircraft 10. The locating arms 144, 146, 154, 156 are oriented with obtuse arm angles 304, 306. The locating arms 144, 146, 154, 156 have different telescoped lengths.

Figure 8:
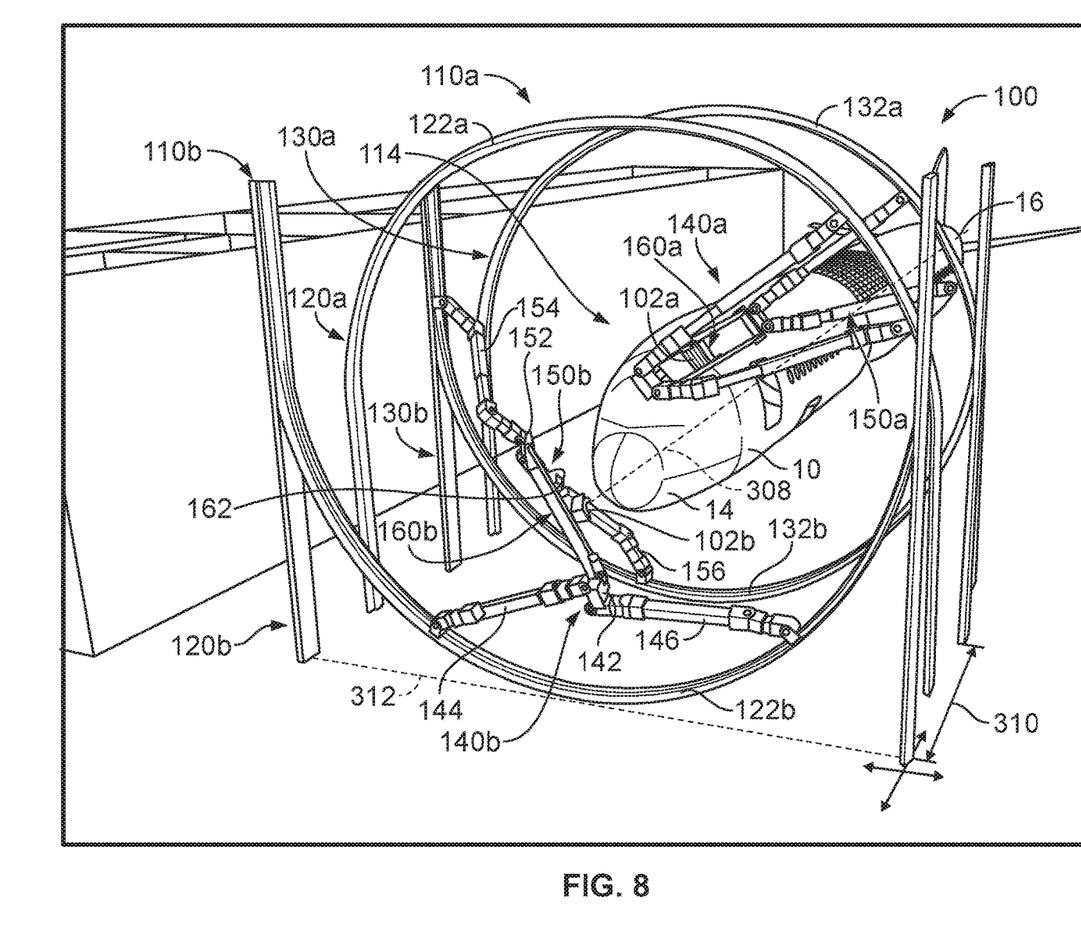
FIG. 8 illustrates the gantry system in accordance with an exemplary embodiment.

FIG. 8 illustrates the gantry system 100 in accordance with an exemplary embodiment. FIG. 8 illustrates the gantry system 100 and accordance with an exemplary embodiment with both the upper gantry 110a and the lower gantry 110b. The gantry system 100 includes a first end effector 102a and a second end effector 102b. The gantry system 100 includes a pair of forward carrier assemblies 140a, 140b movably coupled to the corresponding forward gantry frames 120a, 120b and a pair of aft carrier assemblies 150a, 150b movably coupled to the corresponding aft gantry frames 130a, 130b. The forward carrier assemblies 140a, 140b are independently movable and the aft carrier assemblies 150a, 150b are independently movable. In the illustrated embodiment, the forward gantry frame 120a of the upper gantry 110a includes the forward arched member 122a above the aircraft 10 and the forward gantry frame 120b of the lower gantry 110b includes the forward arched member 122b below the aircraft 10. The aft gantry frame 130a of the upper gantry 110a includes the aft arched member 132a above the aircraft 10 and the aft gantry frame 130b of the lower gantry 110b includes the aft arched member 132b below the aircraft 10. The forward carrier assemblies 140a, 140b are movably coupled to the forward gantry frames 120a, 120b, respectively. The aft carrier assemblies 150a, 150b are movably coupled to the aft gantry frames 130a, 130b, respectively. In an exemplary embodiment, the carrier assemblies 140a, 150a are used for processing a different portion of the aircraft 10 than the carrier assemblies 140b, 150b. For example, in the illustrated embodiment, the carrier assemblies 140a, 150a are used for processing the upper side of the aircraft 10 and the carrier assemblies 140b, 150b are used for processing the lower side of the aircraft 10.

FIG. 8 shows the head assembly 160a of the upper gantry 110a generally parallel to a longitudinal axis 308 (extending along the aircraft 10) and the head assembly 160b of the lower gantry 110b angled relative to the longitudinal axis 308. The forward and aft carrier assemblies 140b, 150b have different configurations to angle the head assembly 160b. For example, in the illustrated embodiment, the forward locating arms 144, 146 are retracted and positioned near a center of the forward arched member 122 such that the forward bracket assembly 142 is relatively close to the longitudinal axis 308 while the aft locating arms 154, 156 are extended and positioned along the first side 114 such that the aft bracket assembly 152 is relatively further from the longitudinal axis 308 to angle the head assembly 160b generally parallel to the nose 14 of the aircraft 10. The connecting points of the forward locating arms 144, 146 with the forward gantry frame 120 are different than the connecting points of the aft locating arms 154, 156 with the aft gantry frame 130, such as due to the different length locating arms 144, 146, 154, 156. Having the rails 162 of the head assembly 160b angled transverse to the longitudinal axis 308 allows positioning of the gantry 110 for processing various portions of the aircraft 10, such as the nose 14 or the tail 16, which are non-parallel to the longitudinal axis 308.

In various embodiments, the spacing between the forward gantry frame 120 and the aft gantry frame 130 may be changed to a second spacing 310 shorter than the first spacing 300. Changing the spacing between the forward gantry frame 120 and the aft gantry frame 130 facilitates angling the head assembly 160, such as when the lengths of the rails 162 are fixed.

In various embodiments, the forward gantry frame 120 and/or the aft gantry frame 130 may be shifted laterally along a lateral axis 312 perpendicular to the longitudinal axis 308 to angle the head assembly 160. For example, the forward gantry frame 120 may be shifted toward the aircraft 10 to shift the forward bracket assembly 142 closer to the aircraft 10, such as for processing the nose 14.

Figure 9:
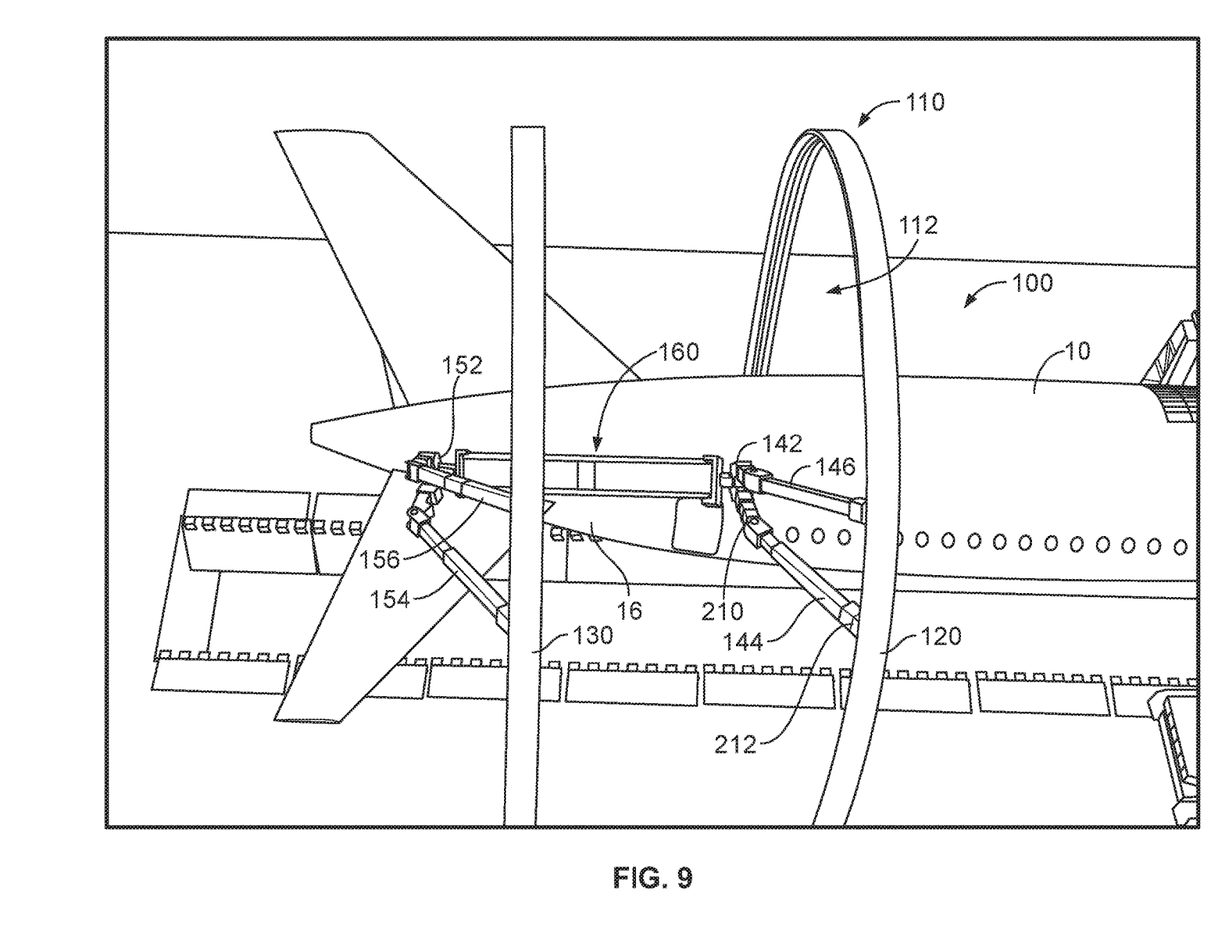
FIG. 9 illustrates the gantry system in accordance with an exemplary embodiment.

FIG. 9 illustrates the gantry system 100 in accordance with an exemplary embodiment. FIG. 9 shows the head assembly 160 shifted axially relative to the gantry 110. For example, the forward and aft bracket assemblies 142, 152 are shifted rearward in the illustrated embodiment causing at least part of the head assembly 160 to be shifted rearward of the interior space 112. The locating arms 144, 146, 154, 156 are angled out of plane with the forward and aft gantry frames 120, 130. For example, the locating arms 144, 146, 154, 156 are pivoted at the first and second joints 210, 212 to allow the head assembly 160 to swing rearward (or forward), such as to reach additional areas of the aircraft 10, such as the tail 16 when the forward and aft gantry frames 120, 130 are unable to align with such areas of the aircraft 10.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A gantry system for processing an aircraft comprising:
  a gantry having an interior space configured to receive a fuselage of the aircraft, the gantry having a gantry frame having an arched member configured to pass from a first side of the interior space to a second side of the interior space along an arcuate path;
  a first locating arm extending between an inner end and an outer end, the outer end being movably coupled to the gantry frame;
  a second locating arm extending between an inner end and an outer end, the outer end being movably coupled to the gantry frame;
  a bracket assembly having a first locating arm bracket pivotably coupled to the inner end of the first locating arm, a second locating arm bracket pivotably coupled to the inner end of the second locating arm, and a head assembly bracket; and
  a head assembly coupled to the head assembly bracket, the head assembly having an end effector for processing the fuselage;
  wherein the head assembly is variably positionable in the interior space by the first and second locating arms moving along the gantry frame for positioning the end effector relative to the fuselage.

2. The gantry system of claim 1, wherein the first and second locating arms are movable along the gantry frame to change an angular position of the head assembly in the interior space.

3. The gantry system of claim 1, wherein the first locating arm includes a telescoping member operable to change a length of the first locating arm between the inner end and the outer end to change a radial position of the head assembly in the interior space, the second locating arm including a telescoping member operable to change a length of the second locating arm between the inner end and the outer end to change a radial position of the head assembly in the interior space.

4. The gantry system of claim 1, wherein the gantry frame includes a track, and wherein the outer ends of the first and second locating arms include slides operably coupled to the track to move along the track.

5. The gantry system of claim 1, wherein the first and second locating arms include locking elements at the outer ends to fix the locations of the first and second locating arms along the gantry frame.

6. The gantry system of claim 1, wherein the first and second locating arms are independently movable along the gantry frame to change a relative spacing of the outer ends of the first and second locating arms along the arcuate path.

7. The gantry system of claim 1, further comprising a pivot driver operably coupled to at least one of the first locating arm and the first locating arm bracket to change a pivot angle between the bracket assembly and the first locating arm to orient the head assembly in the interior space.

8. The gantry system of claim 1, wherein the head assembly includes a rail including a track, and wherein the end effector is movable along the track relative to the head assembly bracket.

9. The gantry system of claim 8, wherein the outer ends of the first and second locating arms are configured to be fixed along the gantry frame when the end effector moves along the track to process the aircraft.

10. The gantry system of claim 1, wherein the arcuate path of the arched member is configured to generally follow a shape of the fuselage of the aircraft in a spaced apart relationship.

11. A gantry system for processing an aircraft comprising:
a gantry having an interior space configured to receive a fuselage of the aircraft, the gantry having a forward gantry frame having a forward arched member configured to pass from a first side of the interior space to a second side of the interior space along an arcuate path, the gantry having an aft gantry frame having an aft arched member configured to pass from a first side of the interior space to a second side of the interior space along an arcuate path;
a forward carrier assembly coupled to the forward gantry frame, the forward carrier assembly comprising a first locating arm extending between an inner end and an outer end being movably coupled to the forward gantry frame, a second locating arm extending between an inner end and an outer end being movably coupled to the forward gantry frame, and a forward bracket assembly pivotably coupled to the inner ends of the first and second locating arms, the forward bracket assembly having a forward head assembly bracket;
an aft carrier assembly coupled to the aft gantry frame, the aft carrier assembly comprising a first locating arm extending between an inner end and an outer end being movably coupled to the aft gantry frame, a second locating arm extending between an inner end and an outer end being movably coupled to the aft gantry frame, and an aft bracket assembly pivotably coupled to the inner ends of the first and second locating arms, the aft bracket assembly having an aft head assembly bracket; and
a head assembly coupled to the forward head assembly bracket and the aft head assembly bracket, the head assembly having a rail including a track, the head assembly having an end effector movable along the track between the forward and aft head assembly brackets for processing the fuselage;
wherein the head assembly is variably positionable in the interior space by the forward carrier assembly and the aft carrier assembly for positioning the end effector relative to the fuselage.

12. The gantry system of claim 11, wherein the first and second locating arms of the forward carrier assembly are movable along the forward gantry frame to change an angular position of the head assembly in the interior space.

13. The gantry system of claim 11, wherein the first and second locating arms of the forward carrier assembly include telescoping members operable to change lengths of the corresponding first and second locating arms.

14. The gantry system of claim 11, wherein the forward gantry frame is movable relative to the aft gantry frame to change a gantry frame spacing therebetween to change a spacing between the forward and aft bracket assemblies corresponding to a change in angle of the rail in the interior space relative to the fuselage.

15. The gantry system of claim 11, wherein the forward carrier assembly is movable along the forward gantry frame independent of movement of the aft carrier assembly along the aft gantry frame to change an angle of the rail in the interior space relative to the fuselage.

16. The gantry system of claim 11, wherein the forward carrier assembly is configured to be fixed along the forward gantry frame and the aft carrier assembly is configured to be fixed along the aft gantry frame to fix the position of the rail of the head assembly relative to the fuselage, and wherein the end effector is configured to move in a linear path along the track to process the fuselage while the forward and aft carrier assemblies remain fixed.

17. The gantry system of claim 11, further comprising a forward pivot driver operably coupled to at least one of the forward bracket assembly and the first locating arm of the forward carrier assembly to change a pivot angle between the forward bracket assembly and the first locating arm of the forward carrier assembly to orient the head assembly in the interior space and further comprising an aft pivot driver operably coupled to at least one of the aft bracket assembly and the first locating arm of the aft carrier assembly to change a pivot angle between the aft bracket assembly and the first locating arm of the aft carrier assembly to orient the head assembly in the interior space.

18. A method of processing a fuselage of an aircraft using a gantry system having a gantry including gantry frames having arched members configured to pass from a first side to a second side of an interior space along arcuate paths, locating arms movably coupled to the gantry frames, bracket assemblies pivotably coupled to corresponding locating arms, and a head assembly coupled to the bracket assemblies, the method comprising:
axially positioning the gantry relative to the fuselage at a first axial position;
moving the locating arms along the arched members to locate the head assembly at a first angular location relative to the fuselage while the gantry is at the first axial position;
actuating the head assembly to move an end effector of the head assembly along the fuselage to process the aircraft while the gantry is at the first axial position and while the head assembly is at the first angular location;

moving the locating arms along the arched members to locate the head assembly at a second angular location relative to the fuselage while the gantry is at the first axial position; and actuating the head assembly to move the end effector of the head assembly along the fuselage to process the aircraft while the gantry is at the first axial position and while the head assembly is at the second angular location.

19. The method of claim 18, further comprising moving the gantry to axially position the gantry relative to the fuselage at a second axial position.

20. The method of claim 18, wherein said moving the locating arms comprises moving the locating arms such that the first angular location is on a first side of the fuselage and such that the second angular location is on a second side of the fuselage.

* * * * *